US008691716B2

(12) United States Patent
Di Noto et al.

(10) Patent No.: US 8,691,716 B2
(45) Date of Patent: *Apr. 8, 2014

(54) ELECTROCATALYSTS BASED ON MONO/PLURIMETALLIC CARBON NITRIDES FOR FUEL CELLS FUELED WITH HYDROGEN

(75) Inventors: Vito Di Noto, Cadoneghe (IT); Enrico Negro, Treviso (IT); Sandra Lavina, Padua (IT); Giuseppe Pace, Albignasego (IT)

(73) Assignee: Breton S.p.A., Castello di Godego (TV) (IT)

(*) Notice: Subject to any disclaimer, the term of this patent is extended or adjusted under 35 U.S.C. 154(b) by 0 days.

This patent is subject to a terminal disclaimer.

(21) Appl. No.: 13/421,970

(22) Filed: Mar. 16, 2012

(65) Prior Publication Data

US 2012/0264594 A1 Oct. 18, 2012

Related U.S. Application Data

(63) Continuation of application No. 12/297,492, filed as application No. PCT/IT2007/000278 on Apr. 17, 2007, now Pat. No. 8,158,548.

(30) Foreign Application Priority Data

Apr. 18, 2006 (IT) .............................. PD2006A0141

(51) Int. Cl.
| | |
|---|---|
| *B01J 21/18* | (2006.01) |
| *B01J 27/20* | (2006.01) |
| *B01J 27/24* | (2006.01) |
| *B01J 23/00* | (2006.01) |
| *B01J 23/42* | (2006.01) |
| *B01J 23/44* | (2006.01) |
| *B01J 23/58* | (2006.01) |
| *H01M 4/02* | (2006.01) |
| *H01M 4/36* | (2006.01) |
| *H01M 4/90* | (2006.01) |
| *H01M 4/92* | (2006.01) |
| *H01M 4/94* | (2006.01) |

(52) U.S. Cl.
USPC ........... 502/174; 502/200; 502/300; 502/325; 502/330; 502/339; 429/523; 429/524; 429/525; 429/526

(58) Field of Classification Search
USPC ................ 502/174, 200, 300, 325, 330, 339; 429/523–526
See application file for complete search history.

(56) References Cited

U.S. PATENT DOCUMENTS

| 8,158,548 | B2 * | 4/2012 | Di Noto et al. ............... 502/174 |
| 2007/0254206 | A1 * | 11/2007 | Gillan et al. .................... 429/40 |

(Continued)

FOREIGN PATENT DOCUMENTS

WO 2009/157033 * 12/2009 ............. H01M 4/86

OTHER PUBLICATIONS

Di Noto, V. et al., "A novel polymer electrolyte baed on oligo(ethyleneglycol) 600, K2PdC14, and KeFe(CN)5," Journal of Materials Research, vol. 12, No. 12, Dec. 1997, pp. 3393-3403.

(Continued)

Primary Examiner — Patricia L Hailey
(74) Attorney, Agent, or Firm — Fredrikson & Byron, P.A.

(57) ABSTRACT

The invention describes the preparation of electrocatalysts, both anodic (aimed at the oxidation of the fuel) and cathodic (aimed at the reduction of the oxygen), based on mono- and plurimetallic carbon nitrides to be used in PEFC (Polymer electrolyte membrane fuel cells), DMFC (Direct methanol fuel cells) and $H_2$ electrogenerators. The target of the invention is to obtain materials featuring a controlled metal composition based on carbon nitride clusters or on carbon nitride clusters supported on oxide-based ceramic materials. The preparation protocol consists of three steps. In the first the precursor is obtained through reactions of the type: a) sol-gel; b) gel-plastic; c) coagulation-flocculation-precipitation.

16 Claims, 5 Drawing Sheets

(56) References Cited

U.S. PATENT DOCUMENTS

2008/0260607 A1 10/2008 Flytzani-Stephanopoulos et al.
2010/0041544 A1 2/2010 Hu et al.
2010/0113262 A1 5/2010 Wakamatsu et al.

OTHER PUBLICATIONS

Di Noto, V. et al., "Zeolitic inorganic-organic polymer electrolytes: synthesis, characterization and ionic conductivity of a material based on oligo(ethyleye glycol) 600, (CH3)2SnCl2 and K4Fe(CN)6," Electrochimica Acta 46 (2001), pp. 1587-1594.

Di Noto, V. et al., "The first lithium zeolitic inorganic-organic polymer electrolyte based on PEG600, Li2PdCl4 and Li3Fe(CN)6: part I, synthesis and vibrational studies," Electrochimica Acta 48 (2003), pp. 2047-2058.

Di Noto, V. et al., "The first lithium zeolitic inorganic-organic polymer electrolyte based on PEG600, Li2PdCl4 and Li3Fe(CN)6: part II, thermal stability, morphology, and ion conduction mechanism," Electrochimica Acta 48 (2003), pp. 2227-2237.

"PCT International Search Report dated Aug. 20, 2007 for PCT/IT2007/000278".

Di Noto, V. et al., "Pd—Co carbon—nitride electrocatalysts for polymer electrolyte fuel cells," Electrochimica Acta 53 (2007) 1604-1617.

Di Noto, V. et al., "A Pt—Fe Carbon Nitride Nano-electrocatalyst for Polymer Electrolyte Membrane Fuel Cells and Direct-Methanol Fuel Cells: Synthesis, Characterization, and Electrochemical Studies," Advanced Functional Materials (2007), 17, 3626-3638.

Di Noto, V. et al., "Osygen reduction on carbon nitride supported mono-/plurimetallic catalysts," Transworld Research Network, Catalysts for Oxygen Electroreduction—Recent Developments and New Directions (2009), ISBN: 978-81-7895-313-7, 1-36.

Di Noto, V. et al., "New Bimetallic Catalysts for the Oxygen Reduction Reaction (ORR) Based on Ni and Pt Carbide: Synthesis, Characterization and Electrochemical Studies," ECS Transactions, 2 (8) (3007) 83-91.

Di Noto, V. et al., "New Platinum-free Carbon Nitride Electrocatalysts for PEMFCs Prepared Using as Precursors PAN/M(CNCH3)x Complexes (M=Pd, Co. Au, Ni)," ECS Transactions, 11 (1) (2007) 249-260.

Di Noto, V. et al., "Synthesis, characterization and electrochemical performance of tri-metal Pt-free carbon nitride electrocatalysts for the oxygen reduction reaction," Electrochimica Acta 55 (2010) 1407-1418.

Di Noto, V. et al., "Pt and Ni Carbon Nitride Electrocatalysts for the Oxygen Reduction Reaction," Journal of the Electrochemical Society, 154 (8) (2007) B745-756.

Negro, E. et al., "Polymer electrolyte fuel cells based on bimetallic carbon nitride electrocatalysts," Journal of Power Sources 178 (2008) 634-641.

Di Noto, V., et al., "A new Pt—Rh carbon nitride electrocatalysist for the oxygen reduction reaction in polymer electrolyte membrane fuel cells: Synthesis, characterization and single-cell performance," Journal of Power Sources 195 (2010) 638-648.

* cited by examiner

ELECTROCATALYSTS BASED ON MONO/PLURIMETALLIC CARBON NITRIDES FOR FUEL CELLS FUELED WITH HYDROGEN

RELATED APPLICATIONS

This application is a continuation of U.S. patent application Ser. No. 12/297,492, filed Oct. 17, 2008 now U.S. Pat. No. 8,158,548, which is a US 371 national stage entry of International Application No. PCT/IT2007/000278, filed Apr. 17, 2007, which claims priority to Italian Application No. PD2006A000141 filed Apr. 18, 2006, the teachings of each which are incorporated herein by reference.

TECHNICAL FIELD

The invention concerns the anodic and cathodic electrocatalysts to be used in fuel cells operating at low temperatures and in $H_2$ electrogenerators together with the methods used to prepare the materials constituting those electrocatalysts.

BACKGROUND ART

To allow a fuel cell operating at low temperature to produce an adequate amount of current at acceptable potentials it is necessary to achieve a quick and efficient catalytic conversion of the reagents into products. At the anode, the fuel (hydrogen, methanol, ethanol, etc. . . . ) is oxidised producing $H^+$ ions and other products; at the cathode, the oxidant (air or oxygen) is reduced developing $O^{2-}$ ions. Nowadays, all the electrocatalysts used in fuel cells operating at low temperatures are based upon platinum, either pure or supported on graphite. Electrodic materials are generally produced through an electrochemical reduction of precursors containing platinum and ruthenium on graphite nanopowders (carbon black). The result is an extremely thin black powder characterized by a large surface area and featuring graphite grains covered by metallic platinum. Cathodic electrocatalysts show platinum concentrations equal to 10-20 weight %, while anodic electrocatalysts may also have ruthenium, needed to limit the poisoning effects on the active sites caused by carbon monoxide and other poisoning agents such as halides, ammines, amides produced either by parasitic reactions such as fuel oxidation or present in the reagents in trace amounts. One of the main limits towards the large-scale use of this type of materials is their high cost; besides, it should be pointed out that not every metal may be deposited on graphite-based supports by electrochemical means.

It is reported in the scientific literature that the alloying of a second non-noble metal with platinum may result in an improvement of the electrocatalytic activity of the system. The second metal might also act as a protection for the active sites towards contaminants such as carbon monoxide or halides. These contaminants reduce the activity of the active sites of the noble metal constituting the electrocatalyst. This way it becomes possible to obtain materials showing a higher tolerance towards environmental contaminations, having a longer operating lifetime and a lower cost.

DISCLOSURE OF INVENTION

The procedure to prepare materials having a large surface area to be used as anodic and cathodic electrocatalysts consists of three steps. In the first the precursor is obtained through chemical reactions based on the following transitions: a) sol-gel; b) gel-plastic; c) coagulation and/or flocculation and/or precipitation. The second step leads to the production of mono-plurimetallic carbon nitrides (MPM-CN) through suitable thermal treatments of the precursors in an inert nitrogen or argon atmosphere. The last step consists in the procedures to perform the chemical and electrochemical activations of the electrocatalysts obtained in the second step.

Precursors are obtained as described below in a detailed way through: a) complexation reactions of "soft" transition metals with complexes such as cyanometallates acting as ligands to produce clusters; b) 3-D networking of the obtained clusters with suitable organic molecules and macromolecules. The latter are also the main source of the carbon atoms necessary to provide a good electronic conductivity to the prepared catalyst. The selected organic substance must be water-soluble, must not contain sulphur atoms and must be very rich of oxygen atoms. Typical examples include polyethylene glycol, polyvinyl alcohol, glycerol, sucrose, glucose, fructose and in general all the water-soluble macromolecules such as carbohydrates, etc. . . .

Once the most suitable organic compound for the desired synthesis has been chosen, two different solutions are prepared, A and B. The first, solution A, consists of a "soft" transition metal complex coordinated by good leaving groups and an aliquot of organic binder dissolved in water. Typical examples of "soft" transition metal complexes used in the preparation of the solution A are: $HAuCl_4$, $H2IrCl_6$, $H2PtCl_6$, $Li_2PdCl_4$, $(NH_4)_2IrCl_6$, $(NH_4)_2OsCl_6$, $(NH_4)PdCl_4$, $(NH_4)_2PdCl_6$, $(NH_4)_2PtCl_4$, $(NH_4)_2PtCl_6$, $(NH_4)_3RhCl_6$, $(NH_4)_2RuCl_6$, $KAuCl_4$, $KPt(NH_3)Cl_3$, $KPdCl_4$, $K_2PtCl_4$, $K_2PdCl_6$, $K_2PtCl_6$, $K_2ReCl_6$, $K_2RhCl_6$, $KH_2IrCl_6$, $K_2H_2OsCl_6$, $K_3IrCl_6$, $K_3H_3RuCl_6$, $Na_2IrCl_6$, $Na_2OsCl_6$, $Na_2PdCl_6$, $Na_2PtCl_6$, $Na_3RhCl_6$, $CrCl_3$, $IrCl_3$, $FeCl_3$, $NiCl_2$, $OsCl_3$, $PdCl_2$, $PtCl_2$, $PtCl_4$, $RhCl_3$, $RuCl_3$, $ReCl_5$, $SnCl_4$, $VCl_3$, $VCl_4$, $WCl_4$, $WCl_6$, $ZrCl_4$, etc.

Solution B is obtained by dissolving in water a suitable amount of a metallic complex, such as a cyanometalate, capable to act as a ligand for "soft" metals, together with an aliquot of the same organic compound used in the preparation of the solution B. Typical examples of cyanometallates which can be used are: $KAg(CN)_2$, $KAu(CN)_2$, $K_2Ni(CN)_4$, $K_2Pd(CN)_4$, $K_2Pt(CN)_4$, $K_3Co(CN)_6$, $K_3Cr(CN)_6$, $K_3Fe(CN)_6$, $K_3Mn(CN)_6$, $K_2Pt(CN)_6$, and $K_4Ru(CN)_6$.

Solutions A and B must be mixed together and stirred until they are completely transparent. If the catalyst material is to be supported on a ceramic substrate, such as $Ag_2O$, $Al_2O_3$, $As_xO_y$, $Au_2O_3$, $Bi_2O_3$, $CeO_2$, $Co_xO_y$, $Cr_xO_y$, $Cu_xO$, $EuO_2$, $Fe_xO_y$, $Ga_2O_3$, $HfO_2$, $Ir_2O_3$, $La_2O_3$, $MnO_2$, $Mo_xO_y$, $Nb_xO_y$, $Nd_2O_3$, $NiO$, $OsO_x$, $PbO_x$, $PdO$, $PrO_2$, $PtO_x$, $Re_xO_y$, $Rh_2O_3$, $RuO_x$, $Sb_xO_y$, $Sc_2O_3$, $SeO_x$, $SiO_2$, $SmO$, $SnO_2$, $Ta_xO_y$, $TbO_2$, $TeO_x$, $TiO_2$, $V_xO_y$, $W_xO_y$, $ZnO$, $ZrO_2$, at this point of the preparation procedure the desired amount of ceramic nanopowders can be added.

Once the solution is well-mixed the resulting product must be let rest at room temperature. The chemical reaction is considered complete when one of the above-mentioned transitions (sol-gel and/or gel/plastic; coagulation and/or flocculation and/or precipitation) is observed. It may be necessary to wait for a few days for these reactions to occur.

Should the product have the features of a suspension, the first thing to do is to remove the excess solvent. This result can be achieved with two different procedures: a) filtration; or b) by drying the reaction mixture. This latter treatment is performed in a rotovapor at 60° C. until a compact and homogeneous solid remains. The drying process may last a few days.

The obtained precursor undergoes a thermal treatment as described below. At first the material is kept under dynamic vacuum at 10-3 bar for 16-24 hours at 150-200° C., then a first step is performed stabilizing the material at a higher temperature (300-1200° C.) for no longer than two hours. Lastly, a further thermal treatment under dynamic vacuum (10-3 bar) is performed at high temperature (400-1200° C.), lasting between one and six hours.

The resulting material is finely ground, at first in a mortar and then in a ball mill and subsequently washed repeatedly with water so as to remove halides and other soluble reaction products.

The washed material is activated through three washings in hydrogen peroxide, 10% vol., and is eventually dried and further ground with a ball mill.

The reaction between the chloride of the transition metal and the cyanometallate when the organic binder is present results in a compact and homogeneous material where the desired quantity of metallic centres is uniformly distributed. The thermal treatment performed under vacuum removes the oxygen and hydrogen atoms of the organic binder from the material; furthermore, it provides the energy necessary to activate the nucleation and growth of the carbon nitride-based clusters of the desired metals. The clusters are of nanometric size and have the programmed chemical composition. The ceramic oxides, if they are present, provide a matrix featuring an extremely large surface area where the catalytic material based on mono-plurimetallic carbon nitrides can be supported. The carbon of the carbon nitride clusters formed following the decomposition of the organic binder guarantees to the material the electrical conductivity necessary for its operation. The main aim of the prolonged washing with bidistilled water is the removal from the electro-active material of possible halide-based soluble derivatives: should they bind permanently on the active cluster sites, they would compromise the catalytic activity of the material. The treatment with hydrogen peroxide is performed so as to "clean" the external surface of the clusters from impurities which could both poison the active catalytic sites and make the active metallic area of the material smaller.

The main features of the invention are highlighted in the following descriptions which should be considered, together with the attached graphs, specific information concerning particular examples reported only for illustrative and not for limitative purposes.

EXHIBIT A EXPERIMENTAL DATA

Example 1

Material PtNi600

This example reports the detailed description of the synthesis of a material type MPM-CN for the cathodic reduction of oxygen based on platinum and nickel.

4.46 g of sucrose were dissolved in 9 ml of milli-Q water; the resulting solution was divided into two aliquots, the former consisting of 4 ml, the latter of 5 ml. 832 mg of K2PtCl4 were dissolved into the former, yielding a deep red clear solution having a 0.5 M concentration in PtCl42-complexes. 1288 mg of K2Ni(CN)4 with a hydration degree of 30% were dissolved into the latter solution of water and organic binder, yielding a clear light yellow solution having a 0.75 M concentration in Ni(CN)42-complexes. The first solution was added dropwise into the second, stirred for 15 minutes at room temperature and allowed to rest for three days. At the end of this period of time, on the bottom of the vessel a very thin light grey powder is found deposited under a clear, very light yellow solution. The sample was transferred into a quartz tube where the drying process was protracted for three days keeping the warming bath at 60° C. The final product was a viscous, light blue liquid.

The quartz tube was connected to a vacuum line and brought to 10-3 bar. The sample placed under vacuum underwent a first thermal treatment at 180° C. for 24 hours; in this phase it appeared opaque and was emerald green. The resulting solid was then thermally treated at 300° C. for two hours under dynamic vacuum and was eventually allowed to rest. The obtained solid product looked like a blackish, very rough powder. After finely grinding it into a mortar, the product was re-introduced into a quartz tube, where it underwent a further thermal treatment at 600° C. under dynamic vacuum for two hours. Afterwards, the sample was removed from the tube, finely ground in a mortar and eventually washed four times with milli-Q water to remove the soluble byproducts and the chloride ions deriving from the chemical reaction. The material was dried under an IR lamp. At the end of each washing step the mother waters were separated from the sample by centrifugation at 3000 rpm for 15 minutes.

The resulting powders were then transferred to a glass beaker and treated with about 40 ml of hydrogen peroxide, 10% vol., as follows. About 5 ml of hydrogen peroxide were used to cover the sample, over which a significant evolution of bubbles was observed. The thinnest powders became suspended, and when the bubble evolution stopped they were removed using a Pasteur pipette and transferred into a glass Petri capsule placed under an IR lamp to remove the remaining water. In the meantime, further 5 ml of hydrogen peroxide were placed in the beaker with the remaining powders having a rougher granulometry, so as to obtain a more vigorous cleaning of the material and a more efficient breaking of each grain. This process was repeated until all the material was transferred into the Petri capsule and dried. The resulting powders were ball-milled in an agate ball mill where they were ground for three hours.

Examples 2-4

Materials PtNi400, PtNi500, PtNi700

These examples include the synthesis and characterization procedures of MPM-CN-like materials for the cathodic reduction of oxygen based on platinum and nickel. The preparation of the materials is exactly the same as the one described in Example 1, with the only difference that the final thermal treatment, lasting two hours, was performed at 400, 500 and 700° C. for the materials PtNi400, PtNi500 and PtNi700, respectively. The products, once they were recovered from the quartz tube, were treated, activated and tested as described in Example 1.

Example 5

Material PtNiCe

In this example are described the synthesis and characterization procedures of a MPM-CN-like material for the cathodic reduction of oxygen based on platinum and nickel supported on oxides.

4.46 g of sucrose were dissolved into 2 ml of water yielding a clear, viscous solution. Afterwards, 415 mg of $K_2PtCl_4$ were dissolved under stirring in 1 ml of water, yielding a clear, deep red solution; 644 mg of $K_2Ni(CN)_4$ with a hydration degree of 30% were dissolved in 1 ml of water yielding a clear, light yellow solution. At this time, 1 ml of the solution containing the organic binder was added to each of the solutions containing the metal atoms, which were kept under stirring until clear solutions were obtained. 610 mg of $CeO_2$ nanopowders were then added to the yellow solution containing nickel and sucrose and stirred for 2 hours. The solution containing platinum and the organic binder was added dropwise to the one containing nickel: the resulting suspension was stirred for 16 hours before being transferred into the quartz tube, where it underwent the following thermal treatment: 180° C. for 24 hours, followed by a 300° C. step for two hours and by a final step at 550° C. lasting two hours. The resulting product, once recovered from the quartz tube, was treated, activated and tested as described in Example 1.

Examples 6-8

Materials PtCo400, PtCo500, PtCo700

These examples include the synthesis and characterization procedures of MPM-CN-like materials for the cathodic reduction of oxygen based on platinum and cobalt.

4.46 g of sucrose were dissolved in 9 ml of milli-Q water; the resulting solution was divided into two aliquots, the former consisting of 4 ml, the latter of 5 ml. 832 mg of K2PtCl4 were dissolved into the former, yielding a deep red clear solution having a 0.5 M concentration in PtCl42-complexes. 378 mg of K2Pt(CN)4, hydrated, were dissolved into the second aliquot containing the organic binder yielding a clear solution, where 955 mg of K3Co(CN)6 were further added. The resulting solution was perfectly clear, and consisted of water, organic binder, platinum and cobalt complexes. The first aliquot was added dropwise into the second, stirred for 15 minutes at room temperature and allowed to rest for three days. During this time interval the resulting solution remained clear but it changed its colour from red to light yellow. The whole sample was transferred into a quartz tube connected to a rotovapor, and dried for six hours at 60° C. At the end a light yellow transparent solid sample was obtained. The quartz tube was later connected to a vacuum line at 10-3 bar. The sample underwent a first thermal treatment at 180° C. for 24 hours and later treated at 400° C. for two hours under dynamic vacuum. The resulting product looked like a very rough blackish powder, it was finely ground into a mortar and was labelled PtCo400. The materials PtCo500 and PtCo700 were prepared by thermally treating aliquots of PtCo400 at 500° C. and 700° C. for two hours, respectively. All the resulting products were eventually treated, activated and tested as described in Example 1.

Example 9

Material PtFe900

This example describes the synthesis procedure of a MPM-CN-like material for the cathodic reduction of oxygen based on platinum and iron.

4.46 g of sucrose were dissolved into 9 ml of milli-Q water. The solution was divided into two aliquots, the former consisting of 4 ml and the latter of 5 ml. 1 g of H2PtCl6 was dissolved into the former aliquot, yielding a yellowish solution. 1260 mg of K3Fe(CN)6 were dissolved into the latter aliquot, yielding a yellow solution. The former aliquot was added dropwise into the second, and allowed to rest for a few minutes. Almost instantly, a greenish gel was obtained. The gel was then transferred into a quartz tube and connected to a vacuum line as described in Example 1. The following thermal treatment was applied, always maintaining the dynamic vacuum: a) 16 hours at 200° C.; b) 1 hour at 900° C.; c) 4 hours at 700° C. The product was recovered from the quartz tube and subsequently treated, activated and tested as described in Example 1.

Comparative Example

The catalytic activity of the material described in Example 1 was tested and compared with that of commercial catalysts according to the procedure described below.

A weighed aliquot of the catalyst was brought into suspension in a measured amount of milli-Q water by sonication into an ultrasonic bath for about one hour. The glassy carbon tip of a rotating electrode was mirror-polished with alumina powder, and a known aliquot of the suspension was transferred on top of it with a micropipette aiming at a platinum loading of about 4.7 µg Pt/cm2. The water of the suspension was later removed by placing the tip under an IR lamp. The resulting catalyst layer was later bound to the rotating electrode tip by covering it with a known amount of a solution obtained diluting 100 times with milli-Q water a commercial 5 wt % Nafion™ solution. The objective is to cover the catalyst with a Nafion film about 150 nm thick, so as to obtain a good adhesion of the catalyst without introducing diffusion barriers hindering the feeding of oxygen to the catalyst during the measurement. Water was removed from the solution by drying under an IR lamp.

The electrode was later placed into an electrolytic solution consisting of perchloric acid with a concentration of 0.1 M, kept at 60° C. The electrode tip was always rotated at a fixed speed, 1600 rpm. The cyclic voltammetric measurements were collected in a potential window between 0.05 and 1.15 V vs. NHE, at a sweep rate of 100 mV/sec. The material activation was performed cycling the electrode for 15 hours at 20 mV/sec in nitrogen atmosphere. The material was further cleaned by continuing the cycling for six hours in a pure oxygen atmosphere, kept at the pressure of 1 bar.

In the presence of oxygen, under 0.9 V the cyclic voltammogramm shows a depression towards more negative currents due to the reduction of the oxygen on the surface of the catalytic system. The net oxygen reduction current as a function of the potential was obtained by subtracting from the cyclic voltammogramm obtained under pure oxygen atmosphere the corresponding measure collected under nitrogen atmosphere. In this way the mass reduction activity of each material was obtained, expressed in A/g Pt. The effective platinum concentration in each sample was determined by ICP-AES. In Table 1 and 2 are reported the results obtained for the tested materials. EC-10, EC-20 and EC-20/10 abbreviations refer to the commercial catalysts produced by ElectroChem Inc. used as reference materials.

TABLE 1

Chemical composition of a few MPM-CN electrocatalysts for PEFC and DMFC fuel cells.

| Material | Pt (wt %) | Other Metals (wt %) |
|---|---|---|
| PtNi600 | 16.9 | Ni 9.7 K 2.1 |
| PtNi400 | 12.6 | Ni 8.2 K 5.0 |
| PtNi500 | 14.5 | Ni 8.8 K 4.7 |
| PtNi700 | 17.0 | Ni 9.9 K 2.0 |
| PtNiCe | 10.3 | Ni 6.0 K 2.1 Ce 12.7 |
| PtCo400 | 9.7 | Co 4.3 K 4.0 |
| PtCo700 | 20.6 | Co 6.0 K 0.4 |
| PtFe900 | 17.9 | Fe 8.2 K 0.8 |
| EC-10 | 9.7 | Nil |
| EC-20 | 18.4 | Nil |
| EC-20/10 | 20.0 | Ru 10.0 |

The V * I curve obtained from cyclic voltammetric curves shows a maximum, reported on Table 2, which provides an approximate estimate of the maximum reduction power which can be extracted by each material. Table 2 also shows the potential this maximum is located at.

TABLE 2

Electrochemical features of a few MPM-CN electocatalysts for PEFC and DMFC fuel cells.

| Material | Mass Activity at 0.6 V (A/g Pt) | Maximum Mass Power[1] (W/g Pt) |
|---|---|---|
| PtNi600 | 466 | 387 at 0.465 V |
| PtNi400 | 323 | 328 at 0.439 V |
| PtNi500 | 331 | 385 at 0.443 V |
| PtNi700 | 109 | 224 at 0.347 V |
| PtNiCe | 45 | 50 at 0.323 V |
| PtCo400 | 36 | 161 at 0.310 V |
| PtCo700 | 16 | 58 at 0.255 V |
| PtFe900 | 404 | 398 at 0.444 V |
| EC-10 | 500 | 412 at 0.463 V |
| EC-20 | 314 | 228 at 0.509 V |
| EC-20/10 | 411 | 309 at 0.474 V |

[1]Values determined on the maximum of V * I curve. V and I are determined on the cyclic voltammetry curves.

All the materials mentioned on Table 1 and 2 were tested according to the same experimental protocol in the same conditions. All the electrodes were prepared trying to achieve the same platinum loading; this result was achieved with a relative error lower than 5%. The overall concentration of each deposited catalyst was always between 25 and 49 µg/cm2. The last value is in any case much lower than the limit suggested in the scientific literature, set equal to 100 µg/cm2.

From the data reported in Table 1 and 2 it can be observed that the material prepared according to the procedure outlined in Example 1 shows performances similar to those of the best tested commercial catalyst, in this case the EC-10 produced by ElectroChem Inc. As for the material prepared according to the procedure described in Example 9 is can be observed that the mass activity at 0.6 V is barely below that of the second best commercial catalyst, i.e. EC-20/10, while its maximum mass power is better than that shown by the PtNi600 material and barely lower than that of the best tested commercial catalyst.

Both of the above-mentioned materials are characterized by performances very similar or markedly better in comparison with those of commercial catalysts having a similar weight % of platinum, such as the EC-20 and the EC-20/10 produced by ElectroChem Inc.

Bimetal, MPM-CN-like materials based on platinum and nickel show large reduction mass activities, while all the other materials which have not been quoted until this point show a catalytic activity that even if it is observed at a lower potentials with respect to commercial reference catalysts is nevertheless a significant fraction of theirs.

The materials described in the various examples reported above were also tested as catalysts for the anode oxidation of the fuel introduced in the cell. It was observed that at the beginning of the activation with pure oxygen the hydrogen oxidation peaks could not be located, while at the end of this activation procedure were easily detected in a nitrogen atmosphere. Therefore, it was decided to subtract from the cyclic voltammogramm collected under nitrogen atmosphere after the activation with pure oxygen the cyclic voltammogramm of the same sample collected before this activation process. The difference between the two voltammogramms as a first approximations corresponds to the characteristic voltammogramm which can be associated to active platinum sites, active in the oxidation reaction of hydrogen and methanol. By integrating the area of the oxidation peaks allowed the determination of the active surface platinum area in the materials. Table 3. reports the values of the active specific area of the obtained systems as referred to pure metallic platinum. Results indicate that the materials described in this invention show catalytic activity for the anodic reactions and are promising candidates if compared with commercial systems for applications as anodic electrocatalysts.

TABLE 3

Specific active area for the hydrogen oxidation reaction shown by a few of the MPM-CN-like electrocatalysts for PEFC and DMFC fuel cells.

| Material | Specific Platinum area ($m^2$/g Pt) |
|---|---|
| PtNi600 | 23 |
| PtFe900 | 28 |
| EC-10 | 53 |
| EC-20 | 55 |

The specific active area is referred to that shown by pure platinum.

Figure 1:
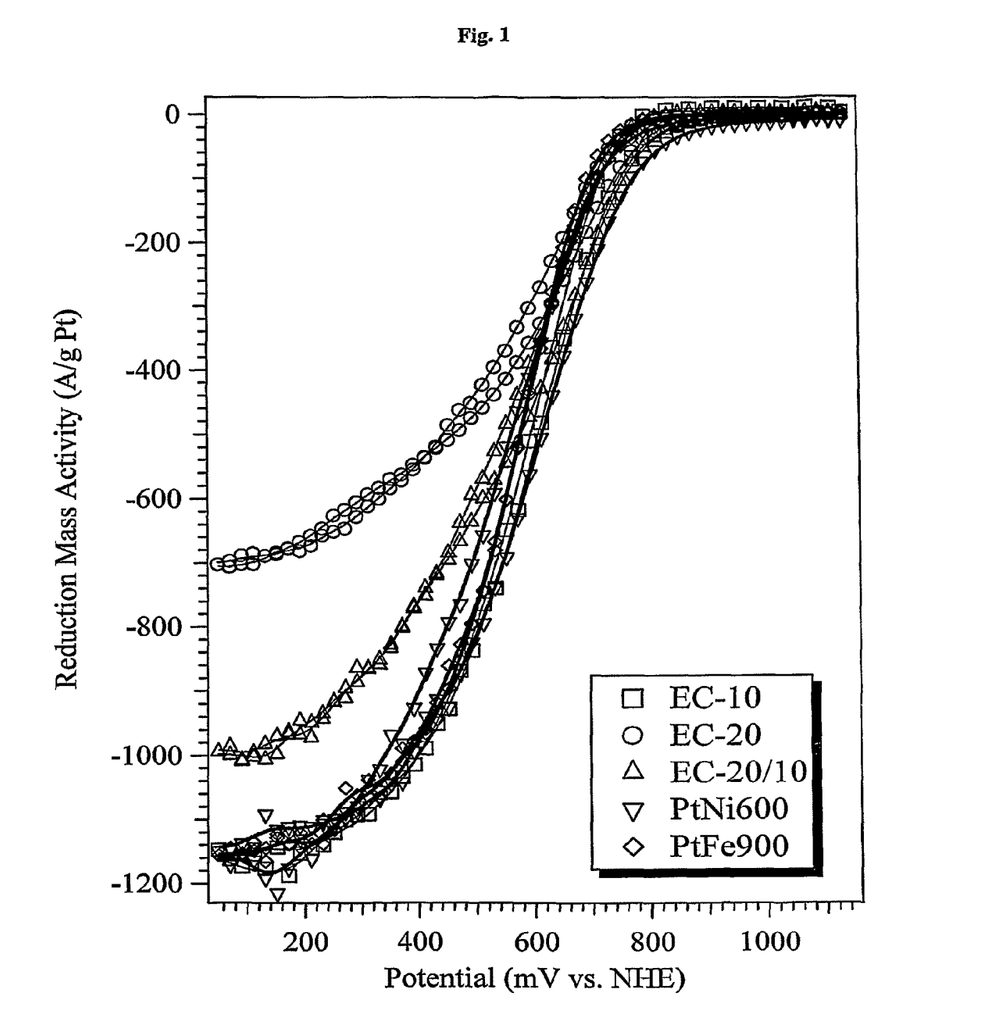
FIG. 1 schematically shows CV-TF-RDE profiles of the reduction mass activity of the materials indicated in the graph determined by Cyclic Voltammetry (CV) using the TF-RDE method (Thin Film Rotating Disk Electrode). Measurements relative to the commercial electrocatalysts used as references are also reported. CV-TF-RDE measurements are collected at 100 mV/s, 1 bar of pure oxygen and at 60° C. using as support electrolyte a 0.1 M solution of $HClO_4$.
Figure 2:
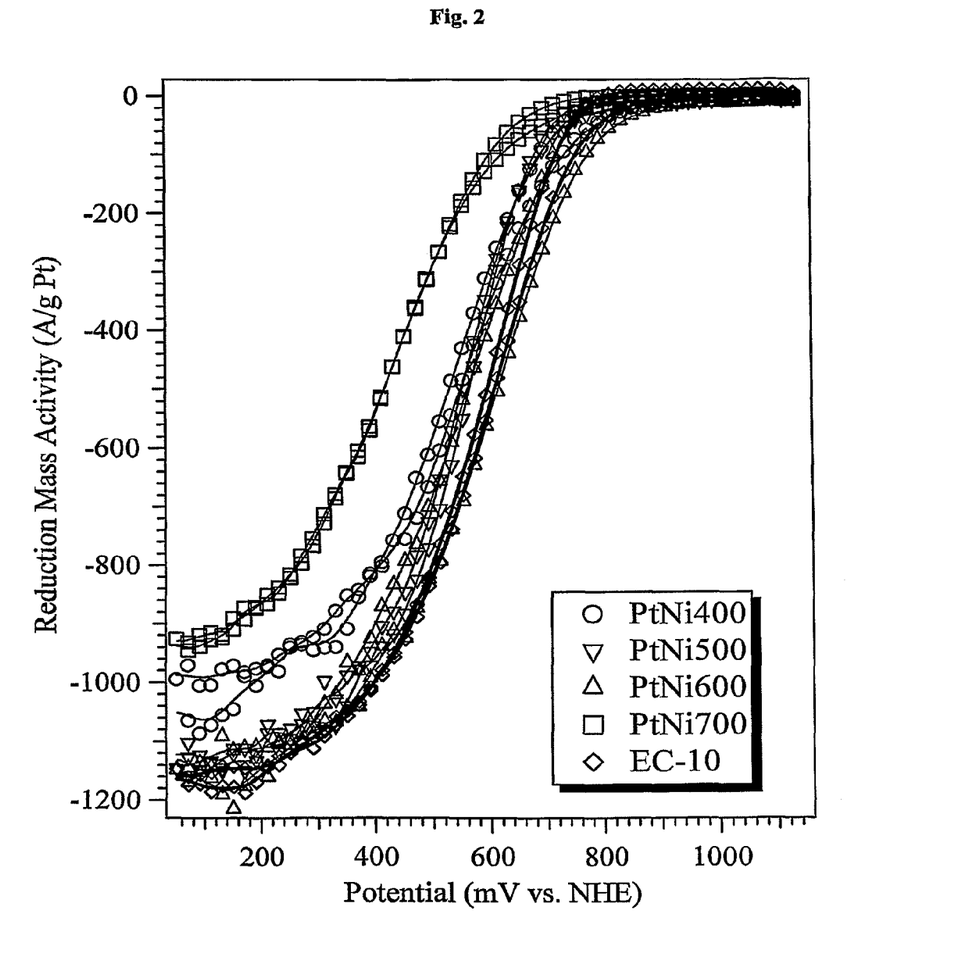
FIG. 2 schematically shows CV-TF-RDE profiles of the reduction mass activity of platinum and nickel carbon nitrides obtained applying different thermal treatments. The conditions of the experimental measurements are the same as those reported in FIG. 1.
Figure 3:
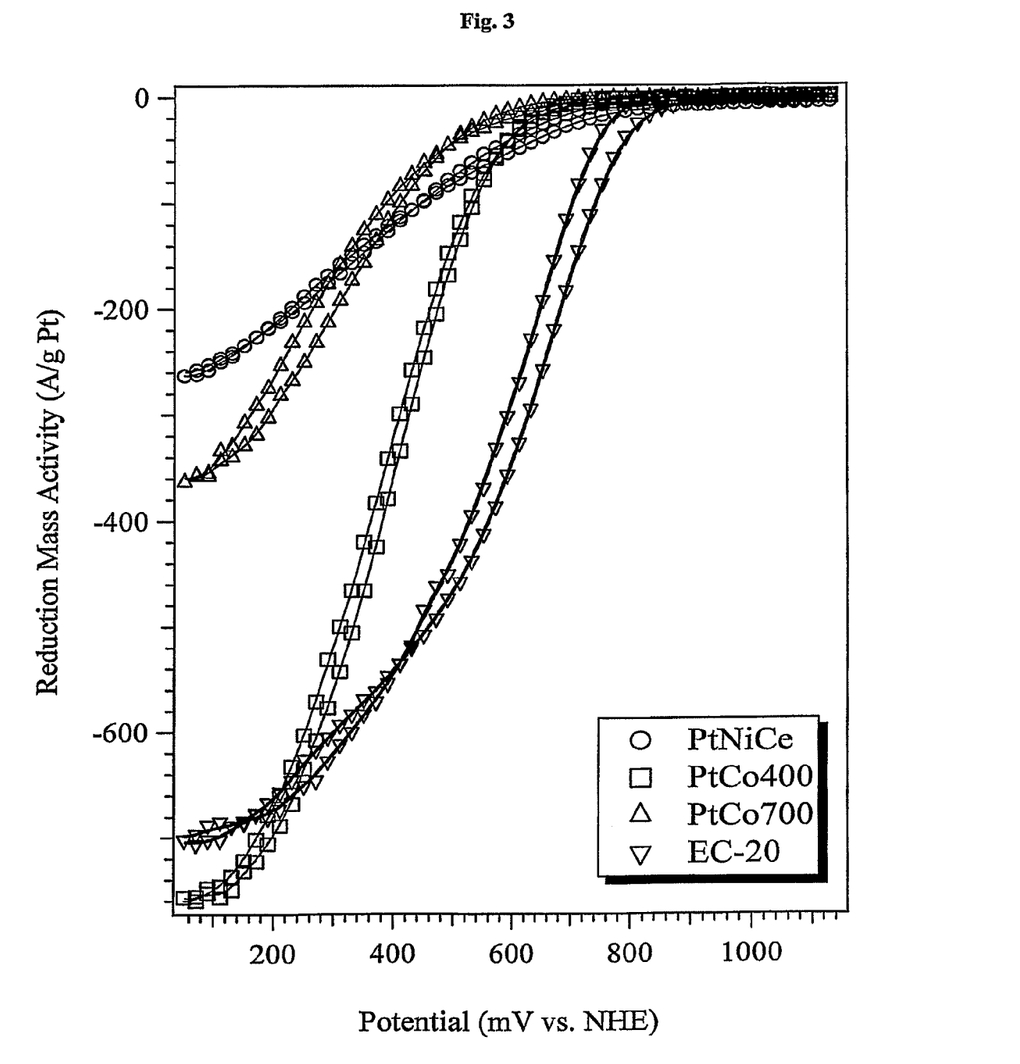
FIG. 3 schematically shows CV-TF-RDE profiles of the reduction mass activity of platinum and cobalt carbon nitrides obtained applying different thermal treatments and platinum-nickel supported on nanometric $CeO2$. The conditions of the experimental measurements are the same as those reported in FIG. 1.
Figure 4:
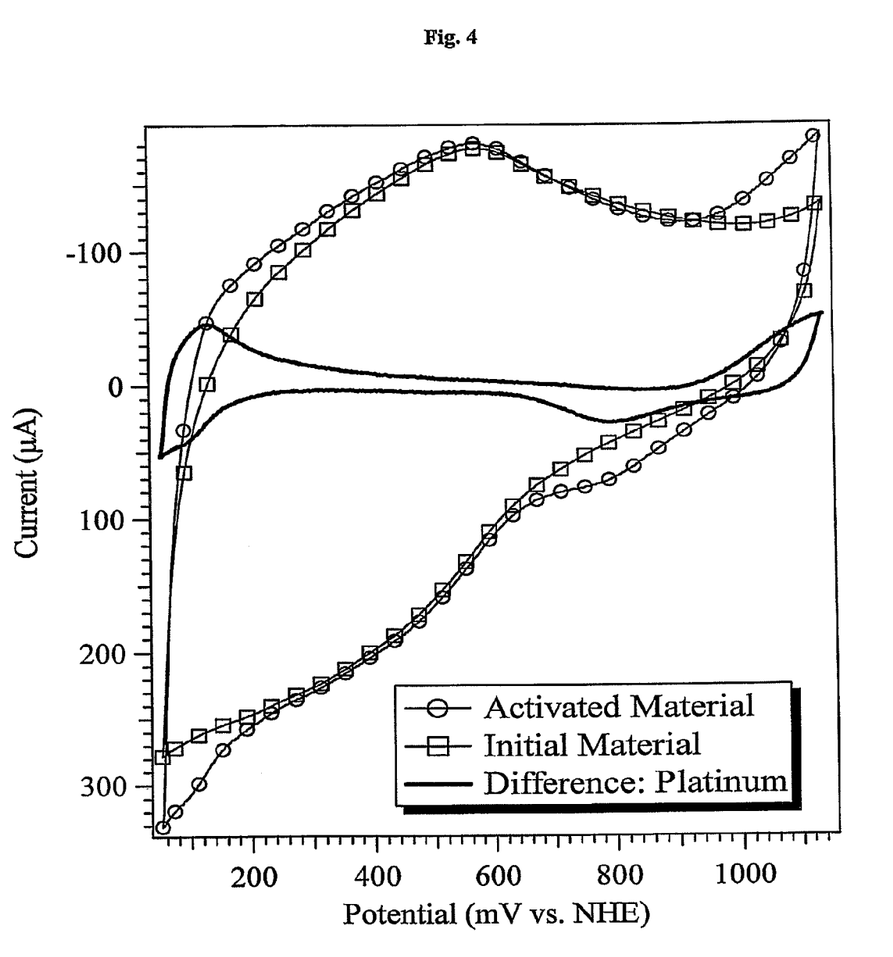
FIG. 4 schematically shows evolution of the cyclic voltammogramms of the PtNi600 material determined with measurements with the CV-TF-RDE method in pure nitrogen atmosphere before (initial material) and after the activation with O2 (activated material). The difference curve shows the typical CV profile of pure platinum. This curve allows the determination of the area of the electrochemically-active catalysts proposed in this invention.
Figure 5:
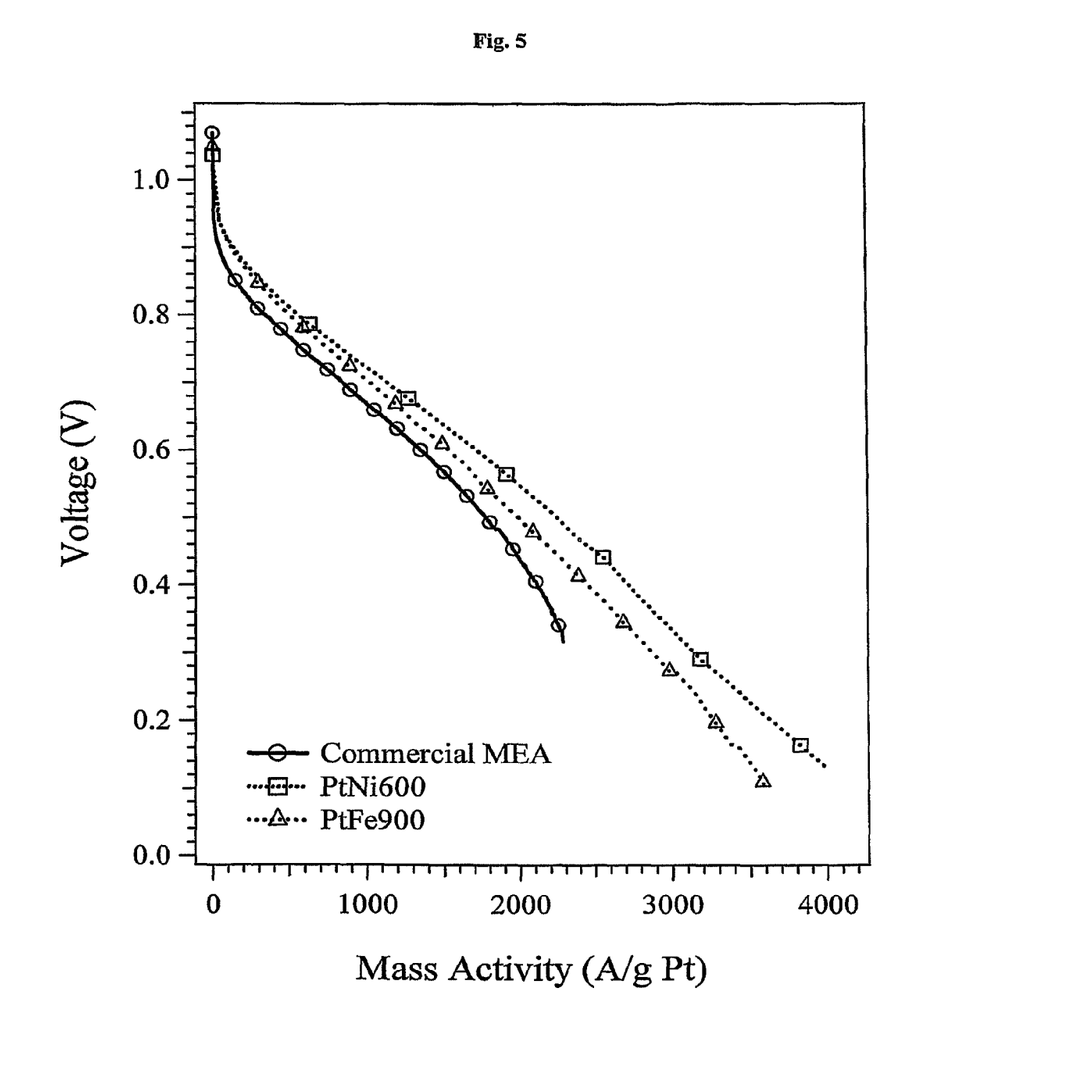
FIG. 5 schematically shows polarization curves of the MEAs prepared with the PtNi600 and the PtFe900 materials, together with the commercial reference. Experimental conditions: T=87/80/87° C.; H2 dew point=87° C.; H2 flux 800 sccm; O2 dew point=85° C.; O2 flux 2000 sccm; reagents pressure 65 psig.

PtNi600 and PtFe900 materials were used in the preparation of membrane-electrode assemblies (MEAs) and tested as cathode catalysts in a single fuel cell. The amount of material used to prepare the MEAs was chosen so as to obtain a Pt loading equal to about 0.4 mg Pt/cm2 of MEA. A commercial MEA produced by ElectroChem. Inc. having a Pt loading at the cathode equal to 1 mg Pt/cm2 of MEA was also tested in the same conditions as reference. The resulting polarization curves are shown on FIG. 5.

Even if the descriptions reported above refer to particular cases in the field of the present invention, it is to be highlighted that it is possible to apply several modifications without diverging too much from the basic concept of the invention itself. The following claims are aimed at covering these modifications applied in the whole possible range of the present invention.

The descriptions reported above should be considered as illustrative, and not exclusive. The whole possible field of the present invention is indicated in the claims and not in the previous descriptions; all the modifications and the alterations falling inside the field of the claims must therefore be included in the present invention.

The invention claimed is:

1. A method for making anodic electrocatalysts configured to oxidize fuel and/or cathodic electrocatalysts configured to reduce oxygen for use in polymer electrolyte membrane fuel cells and direct methanol fuel cells and $H_2$ electrogenerators, the method comprising the step of synthesizing materials having a controlled metallic composition based on mono- and plurimetallic carbon nitrides, wherein the synthesizing step comprises the steps of:
preparing a precursor;
applying a suitable thermal treatment to the precursor; and
activating the electrocatalysts;
wherein the precursor is prepared through sol-gel reactions through steps comprising:
generating a solution A, wherein solution A comprises either water or an organic solvent, an organic binder and at least one complex containing a transition metal coordinated by halides;
generating a solution B, wherein solution B comprises water, an organic binder and at least one cyanometallate; and
mixing solution A and solution B.

2. The method of claim 1 wherein said halide is selected from the group consisting of chlorine, bromine and iodine.

3. The method of claim 1 wherein said complex further contains monovalent cations selected from the group consisting of $H^+$, $Li^+$, $Na^+$, $K^+$ and $NH_4^+$.

4. The method of claim 1 wherein said complex is selected from the group consisting of $HAuCl_4$, $H_2IrCl_6$, $H_2PtCl_6$, $Li_2PdCl_4$, $(NH_4)_2IrCl_6$, $(NH_4)_2OsCl_6$, $(NH_4)_2PdCl_4$, $(NH_4)_2PdCl_6$, $(NH_4)_2PtCl_4$, $(NH_4)_2PtCl_6$, $(NH_4)_3RhCl_6$, $(NH_4)_2RuCl_6$, $KAuCl_4$, $KPt(NH_3)Cl_3$, $K_2PdCl_4$, $K_2PtCl_4$, $K_2PdCl_6$, $K_2PtCl_6$, $K_2ReCl_6$, $K_2RhCl_6$, $K_2H_2IrCl_6$, $K_2H_2OsCl_6$, $K_3IrCl_6$, $K_3H_3RuCl_6$, $Na_2IrCl_6$, $NaOsCl_6$, $Na_2PdCl_4$, $Na_2PtCl_6$, $Na_3RhCl_6$, $CrCl_3$, $IrCl_3$, $FeCl_3$, $NiCl_2$, $OsCl_3$, $PdCl_2$, $PtCl_2$, $PtCl_4$, $RhCl_3$, $RuCl_3$, $ReCl_5$, $SnCl_4$, $VCl_3$, $VCl_4$, $WCl_4$, $WCl_6$ and $ZrCl_4$.

5. The method of claim 1 wherein said cyanometallate is selected from the group consisting of $KAg(CN)_2$, $KAu(CN)_2$, $K_2Ni(CN)_4$, $K_2Pd(CN)_4$, $K_2Pt(CN)_4$, $K_3Co(CN)_6$, $K_3Cr(CN)_6$, $K_3Fe(CN)_6$, $K_3Mn(CN)_6$, $K_2Pt(CN)_6$ and $K_4Ru(CN)_6$.

6. The method of claim 1 further comprising the step of combining solution A and solution B into a single solution.

7. The method of claim 6 further comprising the step of preparing a precursor through either a sol-gel reaction or a gel-plastic reaction.

8. The method of claim 6 wherein the step of preparing a precursor employs a reaction selected from the group consisting of coagulation, flocculation, precipitation and combinations thereof.

9. The method of claim 6 further comprising the step of adding a nanometric support to the single solution, wherein the nanometric support includes at least one oxide selected from the group consisting of $Ag_2O$, $Al_2O_3$, $As_xO_y$, $Au_2O_3$, $Bi_2O_3$, $CeO_2$, $Co_xO_y$, $Cr_xO_y$, $Cu_xO$, $EuO_2$, $Fe_xO_y$, $Ga_2O_3$, $HfO_2$, $Ir_2O_3$, $La_2O_3$, $MnO_2$, $Mo_xO_y$, $Nb_xO_y$, $Nd_2O_3$, $NiO$, $OsO_x$, $PbO_x$, $PdO$, $PrO_2$, $PtO_x$, $Re_xO_y$, $Rh_2O_3$, $RuO_x$, $Sb_xO_y$, $Sc_2O_3$, $SeO_x$, $SiO_2$, $SmO_5$, $SnO_2$, $Ta_xO_y$, $TbO_2$, $TeO_x$, $TiO_2$, $V_xO_y$, $W_xO_y$, $ZnO$, and $ZrO_2$, wherein x represents a number that is greater than or equal to 1 and less than or equal to 5 and wherein y represents a number that is greater than or equal to 1 and less than or equal to 7.

10. The method of claim 1 wherein the organic binder is any molecule, macromolecule or macromolecular system having in its structure functional groups selected from the group consisting of hydroxyl, amino, amide, ester, phosphine and nitrile.

11. The method of claim 10 wherein said molecule, macromolecule or macromolecular system has a hydroxyl group in its structure and includes a compound selected from the group consisting of sugars, alcohols, polyalcohols, polyesters, polyethers, amides, polyamides, polyacrilates and polyimides.

12. The method of claim 1 wherein the step of applying a thermal treatment to the precursor comprises a first step that is executed at a temperature ranging from 180° C. and 400° C. and at least a second step that is executed at a temperature ranging from 300° C. and 900° C. wherein all said steps are performed in an inert Ar or $N_2$ atmosphere or under vacuum.

13. The method of claim 1 wherein the step of activating the electrocatalysts simulates a cyclic voltammetry technique in an inert gas alternated to an oxidant gas and a reducing gas.

14. The method of claim 1 wherein the step of activating the electrocatalysts includes a step of alternating: a) oxidation through a selected one of $O_2$ and $H_2O_2$ and b) reduction through a reagent selected from a group consisting of $H_2$, formaldehyde, hydrazine, and hydrazine dichloride.

15. Anodic electrocatalysts obtained from the method of claim 1.

16. Cathodic electrocatalysts obtained from the method of claim 1.

* * * * *